United States Patent Office 3,567,647
Patented Mar. 2, 1971

---

3,567,647
PHOSPHORESCENT CRYSTALS
Gerard Ernest Gerhardt, Warren Township, Somerset County, N.J., assignor to American Cyanamid Company, Stamford, Conn.
No Drawing. Filed Mar. 27, 1968, Ser. No. 716,300
Int. Cl. C09k 1/02; C09d 5/22
U.S. Cl. 252—301.2
14 Claims

ABSTRACT OF THE DISCLOSURE

A phosphorescent composition comprising mixed crystals of (a) a polynuclear condensed ring compound such as pyrene, a halopyrene, benz[a]anthracene, benzo[ghi]perylene, coronene and/or the corresponding deuterated compounds, and (b) anthraquinone, a halogenated anthraquinone and/or an alkyl anthraquinone. The mixed crystals contain at least 0.001 mole percent of component (a). The phosphorescent compositions can be incorporated in liquid vehicles such as lacquers, paints or printing inks, and can be applied to the surface of solid articles such as paper, wood, or metals to impart phosphorescence thereto.

---

This invention relates to organic phosphorescent materials and compositions containing the same. More particularly, this invention relates to mixed crystals of (a) pyrene, halopyrene, benz[a]anthracene, benzo[ghi]perylene, coronene and/or the corresponding deuterated compounds and (b) anthraquinone, halogenated anthraquinone and/or alkyl anthraquinones which exhibit phosphorescence when irradiated by light and to compositions containing the mixed crystals.

The term "luminescence" as used herein means the emission of light of one wavelength from certain materials when these materials are irradiated by "exciting light" of a different wavelength. The term "luminescence" is a generic term for the terms "fluorescence" and "phosphorescence." When the luminescence occurs during the radiation of the material or very shortly thereafter up to about $10^{-8}$ seconds, it is called "fluorescence." When the luminescence persists, for at least $10^{-6}$ seconds, after extinction of the exciting radiation, it is called "phosphorescence." The term "mixed crystal" as used herein refers to a homogeneous crystal containing more than one organic compound.

At the present time, a large number of inorganic materials exhibit phosphorescence. However, only a relatively few organic materials, either alone or in combination with other materials, exhibit phosphorescence when suitably irradiated by light. In general, the phosphorescence of organic compounds is relatively weak and in many cases it is temperature-sensitive, the phosphorescence occurring only at very low temperature such as —150° C. and lower and disappearing as the temperature is increased. Furthermore, as a general rule, organic crystals do not demonstrate phosphorescence even at these low temperatures unless they are dissolved in another organic crystal.

Somewhat stronger phosphorescence can also be obtained when the phosphorescent organic materials are dissolved in solid solutions, as for example, in gels or gelatin, in glassy solidified sugar melts, or in crystallized acids such as tartaric or boric acid, or when absorbed in absorbates, as for example cellulose products such as paper. However, these types of phosphorescent compositions are generally sensitive to water and even to small amounts of moisture. Thus, it is highly desirable to provide phosphorescent compositions which are relatively insensitive to the degradation effects of moisture and exhibit relatively strong intensity phosphorescence at normal room temperatures in order that these compositions can be employed as phosphorescent coatings.

It is an object of the present invention to provide organic phosphorescent compositions. It is a further object of the present invention to provide organic phosphorescent compositions which are characterized by a relatively strong phosphorescence at normal room temperatures. Further objects of the present invention will become evident in view of the following detailed description.

In accordance with the present invention, organic phosphorescent compositions are provided comprising mixed crystals of (a) an anthraquinone compound, such as anthraquinone, a halogenated anthraquinone and/or an alkyl anthraquinone and (b) a polynuclear condensed-ring aromatic compound, such as pyrene, halopyrene, benz[a]anthracene, benzo[ghi]perylene, coronene and/or the corresponding deuterated compounds (compounds containing at least one deuterium atom). The polynuclear condensed-ring aromatic compound is employed in amounts between 0.001 mole percent and the maximum amount thereof soluble in the anthraquinone compound. The mixed crystals of this invention are essentially colorless, but when irradiated at room temperature with a near UV light of a wavelength less than 4000 angstroms, exhibit a strong phosphorescence in the visible region of the spectrum. The mixed crystals of this invention exhibit an intensity of phosphorescence much higher at room temperature than that of known organic phosphors and are highly resistant to the degradation effects of moisture and water.

That the compositions of this invention exhibit phosphorescence at room temperature is especially surprising in view of the fact that neither the anthraquinone compounds nor the polynuclear condensed-ring aromatic compounds alone exhibit phosphorescence at room temperature. Individually, these compounds are phosphorescent only at very low temperatures and, in the case of pyrene, only in a rigid environment. Furthermore, mixed crystals comprising a minor proportion of pyrene and a major proportion of an organic compound other than anthraquinone compounds, such as benzophenone, only exhibit low temperature phosphorescence and at the same wavelength that pyrene alone phosphoresces. Surprisingly, the compositions of the present invention phosphoresce at wavelengths which are not the same as that of either component. Furthermore, the phosphorescent compositions of the present invention surprisingly lose their phosphorescence with a decrease in temperature.

The mixed crystals of the present invention can be prepared in any manner well known in the art of crystallization such as by fusing the two components together and then allowing the melt to crystallize or preferably, by dissolving the two components, in a minimum amount of hot inert solvent, cooling the solution to cause crystallization of the mixed crystals, and separating the crystals from the solvent. When the fusion method for forming the mixed crystals is employed, the exact amounts of anthraquinone compounds and pyrene compounds can be employed. However, when the solution method is employed, it is advantageous to employ an excess of polynuclear condensed-ring aromatic compound over that desired in the mixed crystals since a portion of the compound will remain in solution.

Suitable anthraquinone compounds which can be employed in the compositions of this invention include anthraquinone, halogenated anthraquinones, or alkyl anthraquinones, as for example, 1-chloroanthraquinone, 2-chloroanthraquinone, 2,3-dichloroanthraquinone, 2-bromoanthraquinone, 2 - fluoroanthraquinone, 2 - methylanthraquinone, 2-ethylanthraquinone, 2-butylanthraquinone, and the like. It is preferred to employ anthraquinone in the compositions of this invention when intense phosphorescence at room temperature for relatively long periods of time is desired. The length of the phosphorescent period can be controlled by selection of the proper anthraquinone compound.

As stated above, either deuterated or undeuterated polynuclear condensed-ring aromatic compounds can be employed in the compositions of this invention. It is preferred to employ deuterated compounds in the compositions of this invention when an increased period of phosphorescence is desired. The amount of polynuclear condensed-ring aromatic compound in the mixed crystals should be at least about 0.001 mole percent. The upper limit is the maximum amount completely soluble in the anthraquinone compounds, usually about 5.0 mole percent. The preferred amount is at least about 0.05 mole percent.

The phosphorescent mixed crystals of the present invention can be applied to or incorporated in a variety of materials. For example, they can be incorporated into plastics, lacquers, paints, printing inks and the like. The mixed crystal concentration employed is that which will give observable phosphorescence to the final product. When mixed with a liquid vehicle the mixed crystals are present in amounts of between about 0.1 and about 50 weight percent based upon the weight of final product. The amount of mixed crystals employed depends upon the solvent effect of the liquid vehicle therefor. It is preferred to incorporate the mixed crystals with liquids which exert a minimum solvent effect for the mixed crystals in order to maintain the phosphorescent activity thereof. The mixed crystals are incorporated into plastic materials by mixing when the plastic material is in a liquid state. It is desirable to effect mixing at a temperature below the melting point of the mixed crystals; preferably at a temperature below about 150° C. After a homogeneous mixture is obtained, the plastic can be solidified as for example by cooling or incorporating therewith a curing agent in a manner well-known in the art.

Suitable plastic materials into which can be incorporated the mixed crystals of this invention include polymers and copolymers containing polyolefins such as polyethylene and polypropylene; polyamides, polyacrylonitrile, poly(vinyl acetate) and cellulose esters. Suitable paint and lacquer vehicles into which can be incorporated the mixed crystals of this invention include alkyd base and latex (polymer emulsion) base paints, and nitrocellulose lacquers. Suitable ink compositions into which can be incorporated the mixed crystals of this invention are the drying oil, organic vehicle and modified mineral oil base inks.

The plastic materials containing the mixed crystals can be employed for use as molding compositions. The paints, printing inks, lacquers and the like containing the mixed crystals can be applied to paper, wood, metal or plastic to effect phosphorescent characteristics on the surfaces thereof. A particularly important application of the compounds of this invention is in inks for various uses including use in automatic marking, sorting and identifying of papers and other articles by photocells and use in data recording applications.

The following examples are intended to illustrate the present invention and are not intended to limit the same.

EXAMPLE 1

A mixture of 0.700 g. of anthraquinone, 0.035 g. of pyrene, and 50 ml. of toluene is heated to the boiling point. The resulting solution is cooled in ice and the crystalline precipitate is separated by filtration and dried. The crystals exhibit a yellow phosphorescence when irradiated with ultraviolet light. The wavelength of peak emission is at 5300 A. and the mean lifetime of the phosphorescence is 0.27 sec.

A phosphorescent product is also obtained by melting anthraquinone and pyrene together without the use of a solvent and then allowing the mixture to crystallize.

EXAMPLE 2

The procedure of Example 1 wherein the components are dissolved in solution is repeated using 1.0 g. of 2-chloroanthraquinone and 0.05 g. of pyrene. The crystalline product shows an orange phosphorescence. The wavelength of peak emission is at 5500 A. and the mean lifetime of the phosphorescence is 0.012 sec.

EXAMPLE 3

The procedure of Example 1 wherein the components are dissolved in solution is repeated using 1.0 g. of 2,3-dichloroanthraquinone and 0.05 g. of pyrene. The crystalline product shows an orange-red phosphorescence. The wavelength of peak emission is 5800 A. and the mean lifetime is less than .001 sec.

EXAMPLE 4

The procedure of Example 1 wherein the components are dissolved in solution is repeated using 1.0 g. of 2-bromoanthraquinone and 0.05 g. of pyrene. The crystalline product shows an orange phosphorescence. The wavelength of peak emission is at 5570 A. The mean lifetime is less than 0.004 sec.

EXAMPLE 5

The procedure of Example 1 wherein the components are dissolved in solution is repeated using 1.0 g. of 2-fluoroanthraquinone and 0.05 g. of pyrene. The crystalline product shows an orange phosphorescence. The wavelength of peak emission is at 5600 A. and the mean lifetime of the phosphorescence is 0.024 sec.

EXAMPLE 6

The procedure of Example 1 wherein the components are dissolved in solution is repeated using 0.5 g. of 2-bromoanthraquinone and 0.025 g. of pyrene-$d_{10}$. The crystalline product shows an orange phosphorescence. The wavelength of peak emission is at 5560 A. and the mean lifetime of the phosphorescence is 0.0062 sec.

EXAMPLE 7

A mixture of 2.0 g. of anthraquinone and 1.0 g. of 1-fluoropyrene is melted and then is allowed to cool. The wavelength of peak emission of the resulting crystals is at 5340 A. and the mean lifetime of the phosphorescence is 0.131 sec.

EXAMPLES 8–12

The procedure of Example 7 is followed using a major amount of an anthraquinone compound (A) and a minor amount of a second compound (B).

TABLE I

| Compound A | Compound B | Peak emission, A. | Lifetime, sec. |
|---|---|---|---|
| Example: | | | |
| 8 — Anthraquinone | Benzo[ghi]perylene | 5,650 | 0.110 |
| 9 — 1-chloroanthraquinone | do | 5,880 | 0.004 |
| 10 — 2,3-dichloroanthraquinone | do | 5,900 | 0.005 |
| 11 — 1-chloroanthraquinone | Coronene | 5,870 | 0.006 |
| 12 — Anthraquinone | Benz[a]anthracene | 5,640 | 0.030 |

EXAMPLE 13

An ink containing 10% by weight of the crystalline product of Example 1 is prepared by grinding the product with an ink vehicle of the styrenated mineral oil class (Superior #2473B Litho Fluorescent Ink Varnish). A pulldown of the ink on bond paper exhibits a yellow phosphorescence when irradiated by ultraviolet light. The pulldown is still phosphorescent after four months' exposure to daylight.

EXAMPLE 14

An ink containing 20% by weight of the product of Example 1 is prepared by grinding together 20 parts of the product, 55 parts of petrolatum and 25 parts of oleic acid. A pulldown of the resulting ink on bond paper exhibits a yellow phosphorescence when irradiated by ultraviolet light.

EXAMPLE 15

The crystalline product of Example 1 is incorporated at 5% by weight into polypropylene using a 2-roll rubber mill. The polymer exhibits a yellow phosphorescence when irradiated by ultraviolet light.

EXAMPLE 16

The crystalline product of Example 1 (2.5 parts) is thoroughly mixed into 7.5 parts of a white paint having the following formulation:

| | Percent |
|---|---|
| Titanium dioxide | 11.0 |
| Titanium calcium | 30.0 |
| Zinc oxide | 2.4 |
| Linseed soya-alkyd resin | 23.9 |
| Mineral spirits | 30.4 |
| Driers | 2.3 |

A drawdown on bond paper has a yellow phosphorescence after irradiation with ultraviolet light.

I claim:

1. A composition of matter comprising mixed crystals consisting essentially of (a) a member selected from the group consisting of anthraquinone, halogenated anthraquinone, alkyl anthraquinone and mixtures thereof and (b) at least 0.001 mole percent of a member selected from the group consisting of pyrene, halogenated pyrene, benz[a]anthracene, benzo[ghi]perylene, coronene, the corresponding deuterated compounds thereof and mixtures thereof.

2. The composition of claim 1 wherein component (a) is anthraquinone.

3. The composition of claim 1 wherein component (b) is deuterated pyrene.

4. The composition of claim 1 wherein component (a) is anthraquinone and the component (b) is pyrene.

5. The composition of claim 1 wherein component (a) is 2-chloroanthraquinone and (b) is pyrene.

6. The composition of claim 1 wherein component (a) is 2,3-dichloroanthraquinone and (b) is pyrene.

7. The composition of claim 1 wherein component (a) is 2-bromoanthraquinone and (b) is pyrene.

8. The composition of claim 1 wherein component (a) is 2-fluoroanthraquinone and (b) is pyrene.

9. The composition of claim 1 wherein component (a) is anthraquinone and (b) is 1-fluoropyrene.

10. The composition of claim 1 wherein component (a) is anthraquinone and (b) is benzo[ghi]perylene.

11. The composition of claim 1 wherein component (a) is 1-chloroanthraquinone and (b) is benzo[ghi]perylene.

12. The composition of claim 1 wherein component (a) is 2,3-dichloroanthraquinone and (b) is benzo[ghi]perylene.

13. The composition of claim 1 wherein component (a) is 1-chloroanthraquinone and (b) is coronene.

14. The composition of claim 1 wherein component (a) is anthraquinone and (b) is benz[a]anthracene.

References Cited

UNITED STATES PATENTS

| 2,296,589 | 9/1942 | Yule | 250—81 |
| 3,066,105 | 11/1962 | McCafferty | 252—301.2 |
| 3,214,383 | 10/1965 | Moore et al. | 252—301.2 |
| 3,230,178 | 1/1966 | Bennahmias | 252—301.2 |

OTHER REFERENCES

Kirk-Othmer Encyclopedia of Chemical Technology, vol. 2, 2nd edition. Interscience Publishers, New York, N.Y., p. 432.

TOBIAS E. LEVOW, Primary Examiner

A. P. DEMERS, Assistant Examiner

U.S. Cl. X.R.

106—20, 260; 252—301.3